US006860795B2

(12) United States Patent
Hagan et al.

(10) Patent No.: US 6,860,795 B2
(45) Date of Patent: Mar. 1, 2005

(54) EDGE FINISHING PROCESS FOR GLASS OR CERAMIC DISKS USED IN DISK DRIVE DATA STORAGE DEVICES

(75) Inventors: James A. Hagan, Rochester, MN (US); Bruce Peter Kruger, Oronoco, MN (US); David C. Paurus, Byron, MN (US); Thomas E. Priebe, Rochester, MN (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 149 days.

(21) Appl. No.: 09/954,812

(22) Filed: Sep. 17, 2001

(65) Prior Publication Data

US 2003/0054736 A1 Mar. 20, 2003

(51) Int. Cl.$^7$ ............................................... B24B 49/00
(52) U.S. Cl. ......................... 451/44; 451/36; 451/180; 451/439; 29/424; 428/43
(58) Field of Search ............................ 451/36, 41, 44, 451/180, 439; 29/424; 428/43, 167; 360/135; 427/154, 289

(56) References Cited

U.S. PATENT DOCUMENTS

| | | | |
|---|---|---|---|
| 3,834,083 A | 9/1974 | Hoshi et al. ............... 51/57 |
| 4,031,667 A | 6/1977 | Schestedt .................. 51/105 |
| 5,447,466 A | * 9/1995 | Wang et al. ............... 451/41 |
| 5,554,063 A | * 9/1996 | Millay et al. ............... 451/9 |
| 5,658,194 A | * 8/1997 | Micheletti ................ 451/541 |
| 5,718,615 A | * 2/1998 | Boucher et al. .............. 451/5 |
| 5,727,990 A | 3/1998 | Hasegawa et al. ........... 451/44 |
| 5,738,563 A | * 4/1998 | Shibata ...................... 451/5 |
| 5,928,066 A | 7/1999 | Hasegawa et al. ......... 451/173 |
| 5,944,584 A | 8/1999 | Toyama .................... 451/41 |
| 6,045,436 A | 4/2000 | Rieger et al. |
| 6,174,222 B1 | 1/2001 | Sato et al. ................ 451/44 |
| 6,319,100 B1 | 11/2001 | Denda et al. |
| 6,363,599 B1 | * 4/2002 | Bajorek .................... 29/424 |
| 6,475,073 B2 | * 11/2002 | Naoi ....................... 451/180 |

FOREIGN PATENT DOCUMENTS

| | | | |
|---|---|---|---|
| EP | 0 759 339 A | 2/1997 | |
| EP | 1 033 351 A1 | 9/2000 | |
| GB | 2 337 712 A | 12/1999 | |
| JP | 1005759 | 1/1989 | ............ B24B/9/00 |
| JP | 4069150 | 6/1992 | ............ B24B/9/08 |
| JP | 5023961 | 2/1993 | ............ B24B/9/10 |
| WO | WO 00/64631 | 11/2000 | |
| WO | WO 01/10595 A1 | 2/2001 | |

OTHER PUBLICATIONS

M. G. Schwabel et al, "Fixed Abrasive Grinding of Glass", published in *Finishing of Advanced Ceramics and Glasses* (R. Sabia, et al, editors; American Ceramic Society, 1999; pp. 175–183).

N. S. Ong et al., "Semi–Ductile Grinding and Polishing", Journal of Materials Processing Technology 83 (1998), pp. 261–266.

M. C. Shaw, *Principles of Abrasive Processing*, Clarendon Press (1996), pp. 552–558.

M. J. Ball, et al., "Electrolytically Assisted 'Ductile' Mode Diamond Grinding of BK7 and SF10 Optical Glasses", SPIE vol. 1573 (1991); pp. 30–38.

* cited by examiner

Primary Examiner—Lee D. Wilson
Assistant Examiner—Anthony Ojini
(74) Attorney, Agent, or Firm—Roy W Truelson (57) ABSTRACT

The circumferential edges of glass or ceramic disks used in disk drive data storage devices are preferably finished by ductile grinding to produce an essentially fracture-free surface, which is not chemically strengthened. Preferably, the material is glass, and both the inner and outer edges of the disk are finished. Edge finishing is preferably achieved in a two-stage process, involving a coarse grind and a ductile grind, using air bearing spindles rotated at high speed for grinding wheels and workpiece. Preferably, the grinding wheels are shaped to provide a radius at the juncture of the circumferential edges and flat disk surfaces.

19 Claims, 8 Drawing Sheets

EDGE FINISHING PROCESS FOR GLASS OR CERAMIC DISKS USED IN DISK DRIVE DATA STORAGE DEVICES

FIELD OF THE INVENTION

The present invention relates to disk drive data storage devices, and in particular, to the manufacture of glass or ceramic disks for use in disk drive data storage devices.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

The extensive data storage needs of modern computer systems require large capacity mass data storage devices. While various data storage technologies are available, the rotating magnetic rigid disk drive has become by far the most ubiquitous. Such a disk drive data storage device is an extremely complex piece of machinery, containing precision mechanical parts, ultra-smooth disk surfaces, high-density magnetically encoded data, and sophisticated electronics for encoding/decoding data, and controlling drive operation. Each disk drive is therefore a miniature world unto itself, containing multiple systems and subsystem, each one of which is needed for proper drive operation. Despite this complexity, rotating magnetic disk drives have a proven record of capacity, performance and cost which make them the storage device of choice for a large variety of applications.

A disk drive typically contains one or more disks attached to a common rotating hub or spindle. Each disk is a thin, flat member having a central aperture for the spindle. Data is recorded on the flat surfaces of the disk, usually on both sides. A transducing head is positioned adjacent the surface of the spinning disk to read and write data. Increased density of data written on the disk surface requires that the transducer be positioned very close to the surface. Ideally, the disk surface is both very flat and very smooth. Any surface roughness or "waviness" (deviation in the surface profile from an ideal plane) decrease the ability of the transducing heads to maintain an ideal distance from the recording media, and consequently decrease the density at which data can be stored on the disk.

The disk is manufactured of a non-magnetic base (substrate), which is coated with a magnetic coating for recording data on the recording surfaces, and which may contain additional layers as well, such as a protective outer coating. Historically, aluminum has been the material of choice for the substrate. As design specifications have become more demanding, it is increasingly difficult to meet them using aluminum, and in recent years there has been considerable interest in other materials, specifically glass. Glass or ceramic materials are potentially superior to aluminum in several respects, and offer the potential to meet higher design specifications of the future.

One of the major drawbacks to the use of glass or ceramic disk substrates is the cost of their manufacture. Glass is currently used in some commercial disk drive designs, although generally at a higher cost than conventional aluminum. In a typical glass disk manufacturing process, the glass base material is initially formed in thin glass sheets. Multiple glass disks are then cut from a sheet. The circumferential edges are finished, which typically requires multiple process steps. The broad, flat data recording surfaces are then lapped to reduce waviness, and polished to a smooth finish, which again may require multiple process steps. The glass substrate thus formed is then coated with a magnetic recording layer, and may be coated with other layers such as a protective layer.

The initial cutting of glass disks from the sheets produces rough circumferential edges at both the outer disk edge and the inner edge of the central aperture. Even though data is not recorded on the circumferential edges, the edges must be finished to provide close tolerances and sufficient mechanical strength. Conventionally, finishing the edge involves multiple process steps. The edges are first ground with a relatively coarse grinder to obtain a round disk within proper dimensional tolerances, and subsequently polished. Finally, the disks are subjected to a chemical strengthening process. Each of these steps adds to the cost of the disk. Even so, glass disks thus produced have certain drawbacks. E.g., the ions implanted during chemical strengthening can leach out under certain conditions, potentially causing device failure.

Glass disks are currently significantly more expensive than conventional aluminum disks. Unless the cost of glass disk manufacture can be substantially reduced, it will be difficult to replace aluminum with glass and realize the potential benefits that glass disks offer.

SUMMARY OF THE INVENTION

In accordance with one or more aspects of the present invention, various improved techniques for finishing the circumferential edges of glass or ceramic disks after cutting are provided. In the preferred embodiment, finishing is performed in such a manner as to avoid the need for subsequent chemical strengthening. Preferably, this is accomplished by grinding the edges in the ductile grinding regime to avoid generation of fractures in the grinding process, and produce an essentially fracture-free surface without the need for further finishing steps.

In the preferred embodiment, the substrate material is glass which is not subjected to chemical strengthening in the manufacturing process. It is further preferred that the substrate be a material which is not chemically strengthenable, i.e., does not contain significant ion impurities such as lithium or sodium needed for chemical strengthening processes. Both the inner and outer circumferential edges of the substrate are ground using vitrified diamond grinding wheels. Both the workpiece, i.e., the disk substrate, and the grinding wheels are mounted on air bearing spindles and rotated at high speed to provide a high degree of dimensional accuracy. A grinding wheel mounting mechanism applies a constant force to the disk substrate as it is ground, until a predetermined stop point is reached.

In the preferred embodiment, the grinding wheels are shaped to provide radiuses at the junction of the circumferential edges with the flat disk surfaces, which is preferably a full radius. A radius disk edge provides improved resistance to cracking or chipping.

In the preferred embodiment, the disk edges are initially ground with a relatively rough vitrified diamond grinding appliance, having diamond particles approximately 40 microns in size, and subsequently ground in the ductile regime with a relatively fine vitrified diamond grinding appliance, having diamond particles approximately 6 microns in size.

By using a ductile regime edge grinding process in accordance with the preferred embodiment of the present invention, edge fractures caused by conventional edge finishing processes are reduced. The reduction in edge fractures substantially increases the mechanical strength of the disk substrate, to the point where additional process steps, including chemical strengthening, are not necessary. Accordingly, the number of process steps is reduced, reducing the cost of manufacture. Additionally, a disk substrate formed of non-chemically strengthenable glass is in certain respects superior to a conventional chemically strengthened glass disk substrate, having high temperature tolerance and reduced susceptibility to failure caused by ion leeching. Higher temperature tolerance may, e.g., be used to advantage by increasing the temperature of the metal sputtering process, which may provide improved sputtered coatings.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Overview of Disk Drive Design

Figure 1:
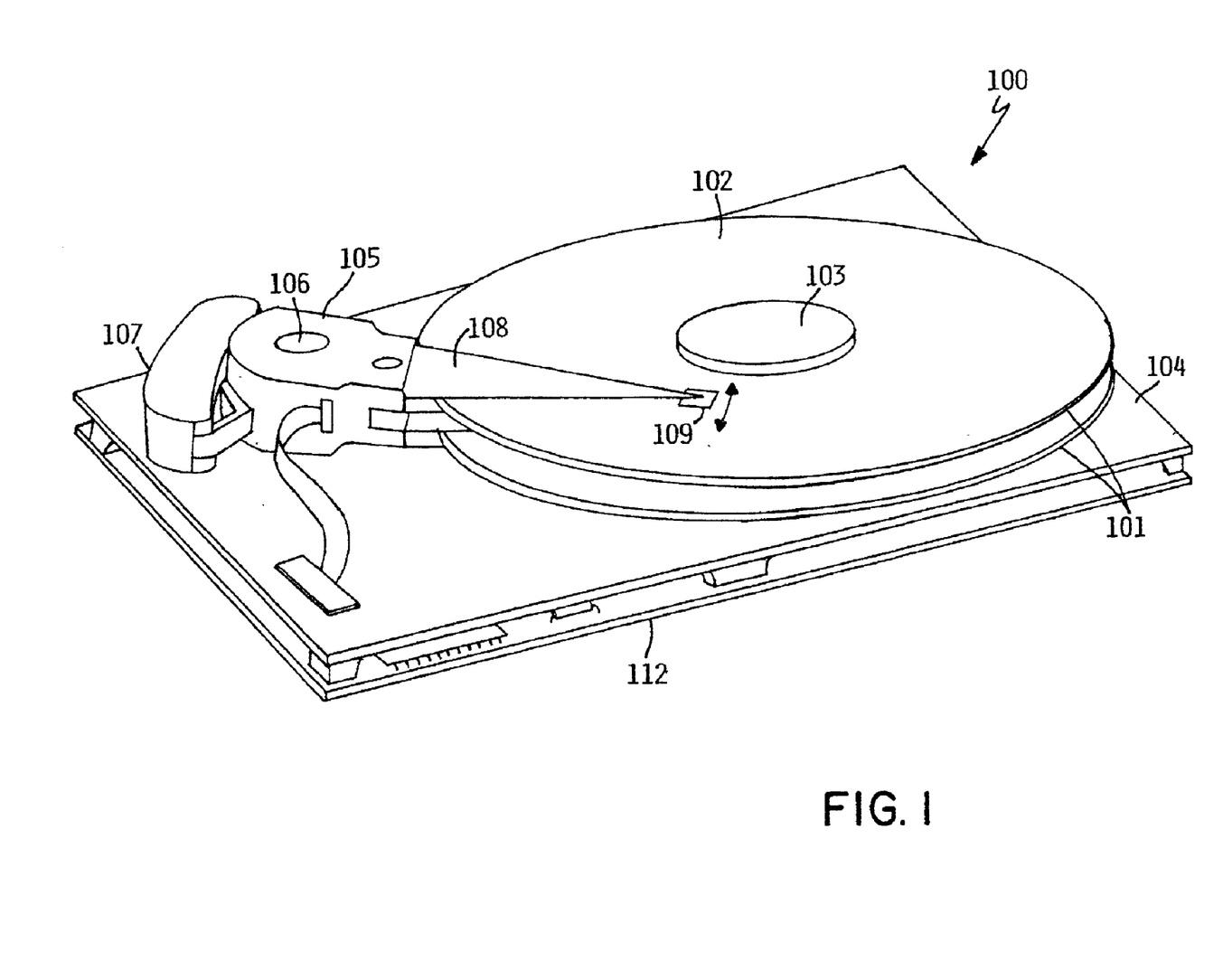
FIG. 1 is a simplified representation of a rotating magnetic disk drive storage device, in which disks as described herein are installed for use, according to the preferred embodiment of the present invention.

Referring to the Drawing, wherein like numbers denote like parts throughout the several views, FIG. 1 is a simplified drawing of the major components of a rotating magnetic disk drive storage device 100, in which disks as described herein are installed for use. Disk drive 100 typically contains one or more smooth, flat disks 101 which are permanently attached to a common spindle or hub 103 mounted to a base 104. Where more than one disk is used, the disks are stacked on the spindle parallel to each other and spaced apart so that they do not touch. The disks and spindle are rotated in unison at a constant speed by a spindle motor.

The spindle motor is typically a brushless DC motor having a multi-phase electromagnetic stator and a permanent magnet rotor. The different phases of the stator are sequentially driven with a drive current to rotate the rotor.

Each disk 101 is formed of a solid disk-shaped base or substrate, having a hole in the center for the spindle. In the past, the substrate has typically been aluminum, but other materials are possible. In accordance with the present invention, glass or ceramic materials are used for the disk substrate, and in particular, according to the preferred embodiment, glass is used as the disk substrate material. The substrate is coated with a thin layer of magnetizable material, and may additionally be coated with a protective layer.

Data is recorded on the surfaces of the disk or disks in the magnetizable layer. To do this, minute magnetized patterns representing the data are formed in the magnetizable layer. The data patterns are usually arranged in circular concentric tracks, although spiral tracks are also possible. Each track is further divided into a number of sectors. Each sector thus forms an arc, all the sectors of a track completing a circle.

A moveable actuator 105 positions a transducer head 109 adjacent the data on the surface to read or write data. The actuator may be likened to the tone arm of a phonograph player, and the head to the playing needle. There is one transducer head for each disk surface containing data. The actuator usually pivots about an axis parallel to the axis of rotation of the disk(s), to position the head. The actuator typically includes a solid block surrounding a shaft or bearing 106 having comb-like arms extending toward the disk (which is, for this reason, sometimes referred to as the "comb"); a set of thin suspensions 108 attached to the arms, and an electromagnetic motor 107 on the opposite side of the axis. The transducer heads are attached to the end of the suspensions opposite the comb, one head for each suspension. The actuator motor rotates the actuator to position the head over a desired data track (a seek operation). Once the head is positioned over the track, the constant rotation of the disk will eventually bring the desired sector adjacent the head, and the data can then be read or written. The actuator motor is typically an electromagnetic coil mounted on the actuator comb and a set of permanent magnets mounted in a stationary position on the base or cover; when energized, the coil imparts a torque to the comb in response to the magnetic field created by the permanent magnets.

Typically, a servo feedback system is used to position the actuator. Servo patterns identifying the data tracks are written on at least one disk surface. The transducer periodically reads the servo patterns to determine its current deviation from the desired radial position, and the feedback system adjusts the position of the actuator to minimize the deviation. Older disk drive designs often employed a dedicated disk surface for servo patterns. Newer designs typically use embedded servo patterns, i.e., servo patterns are recorded at angularly spaced portions of each disk surface, the area between servo patterns being used for recording data. The servo pattern typically comprises a synchronization portion, a track identifying portion for identifying a track number, and a track centering portion for locating the centerline of the track.

The transducer head 109 is an aerodynamically shaped block of material (usually ceramic) on which is mounted a magnetic read/write transducer. The block, or slider, flies above the surface of the disk at an extremely small distance (referred to as the "flyheight") as the disk rotates. The close proximity to the disk surface is critical in enabling the transducer to read from or write the data patterns in the magnetizable layer, and therefore a smooth and even disk surface is required. Several different transducer designs are used. Many current disk drive designs employ a thin-film inductive write transducer element and a separate magneto-resistive read transducer element. The suspensions actually apply a force to the transducer heads in a direction into the disk surface. The aerodynamic characteristics of the slider counter this force, and enable the slider to fly above the disk surface at the appropriate distance for data access.

Various electrical components control the operation of disk drive 100, and are depicted mounted on circuit card 112 in FIG. 1, although they may be mounted on more than one circuit card, and the card or cards may be mounted differently.

It will be understood that FIG. 1 is intended as a simplified representation of a rotating magnetic disk drive, which is merely an example of a suitable environment for using a glass or ceramic disk substrate produced in accordance with the preferred embodiment. It does not necessarily represent the sole environment suitable for such a disk.

DETAILED DESCRIPTION

In accordance with the preferred embodiment of the present invention, the circumferential edges of a glass disk substrate suitable for use, e.g., in a rotating magnetic disk drive data storage device, are finished as herein described. The process of producing a disk substrate is described herein with respect to glass disk substrates, which at present is the material of choice. However, at least some ceramic materials or glass ceramic materials are also potentially suitable for use as substrates in disk drive storage devices, and the present invention is applicable to at least some such ceramic or glass ceramic materials. Certain ceramic or glass ceramic materials have properties which are potentially superior to glass, e.g., higher strength or higher temperature stability. The high cost of manufacture currently discourages use of such materials, but it is foreseeable that such materials may become employed in disk drives in the future, particularly if processes for reducing the cost of manufacture can be found. As used herein, "glass or ceramic" shall include materials which are either glass or ceramic or some combination of glass and ceramic.

In the preferred embodiment, the edges are finished by grinding in the ductile grinding regime. Ductile grinding is known in metal finishing operations, but it is rarely if ever used for glass or ceramic materials which are relatively brittle. Conventional glass grinding is a process which chips and tears away small pieces of the material under the influence of an abrasive (typically diamond). This chipping or tearing action leaves surface roughness and causes subsurface damage in the form of brittle fractures. Even where the surface is subsequently polished to a visibly mirror finish using a cerium oxide polishing agent, some of the subsurface damage remains. Small cracks and surface irregularities can readily spread in brittle materials, substantially reducing the strength of the finished part.

The roughness and depth of damage is related to both the relative grinding speed and the size of abrasive particles. Larger sized abrasives and lower grinding speeds lead to deeper subsurface damage. For sufficiently small sized diamond abrasives and sufficiently high speed, the action of the abrasive on the substrate changes to one of smooth streaking or shaving, leaving virtually no subsurface fracturing. This is referred to as the ductile grinding regime or ductile grinding mode. As used herein, ductile grinding includes any mode in which the predominant abrasive action is ductile, even if occasional brittle cracks occur. Ductile grinding can be expected to produce a very smooth surface, having a roughness of approximately 50 nm rms or less as measured by an atomic force microscope. As a result of edge grinding in the ductile regime, the edge is naturally strong; further edge finishing steps, and in particular chemical strengthening of the substrate, is unnecessary.

The edge grinding process therefore begins with a disk substrate in which the circumferential edges have been cut, but are in an unfinished state. Cutting is generally accomplished by scoring and breaking, although other techniques are possible. It is preferred that the edges be finished before the broad, flat disk surfaces, although it is not necessarily required that this be the case. Generally, the finishing standards for the thin, cylindrical edges are different from those for the broad, flat surfaces, since data is not recorded on the surface of the edges. Typically, finishing of the broad, flat disk surfaces involves multiple process steps such as lapping and polishing, to achieve a very flat, very smooth data recording surface. In some cases, the surface is further textured to improve the magnetic recording properties. Techniques for finishing the flat surfaces, as well as other aspects of the manufacture of a glass disk substrate, are known in the art, and are not the subject of the present invention. Any suitable process steps, now known or hereafter developed, may be used to manufacture the unfinished disk substrate prior to or after the edge finishing herein described.

As an example of a typical conventional technique, although not necessarily the only process by which a glass disk substrate may be fabricated, the following technique is briefly described. The disk is manufactured by first rolling thin glass sheets, much larger than a single disk. Disks are then cut from the thin glass sheets. Central disk apertures are cut in the disks at the same time the disks are cut from the sheets. Cutting leaves rough cylindrical edges at the aperture and outer edge of the disk. Furthermore, the initial glass fabrication process leaves a certain amount of waviness and surface roughness on the broad, flat surfaces. Various finishing steps are required to correct these conditions.

In order to finish the broad, flat surfaces, the surfaces are typically lapped to reduce waviness, and then subjected to polishing in multiple steps to remove a thin fracture layer in the glass left by lapping, and to achieve the requisite surface roughness of the recording surface. In the preferred embodiment, the circumferential edges of the disk are ground as herein described after lapping of the broad, flat surfaces, but before polishing. However, it should be understood that the order of performing these operations could vary. After the broad flat surfaces, and the circumferential edges, of the substrate have been finished, the substrate is coated with a magnetizable layer in a sputtering operation, and may be coated with additional layers in other process steps. Additionally, the disk is cleaned at various stages of manufacture to remove process residues and loose material.

Preferably, the disk substrate is not chemically strengthened, and the substrate material is glass which is not chemically strengthenable. Chemical strengthening is a process that is typically performed on conventional glass disk substrates to provide sufficient mechanical strength and resistance to cracking near the circumferential edges. A typical chemical strengthening process requires that the glass be doped initially with lithium or sodium ion impurities. After processing (such as edge grinding), the disk substrate is subjected to an ion exchange process, in which the dopant ions are exchanged for larger ions (such as potassium) under catalytic conditions. The larger ions create internal compressive stresses in the glass substrate, which increases its strength. In particular, the strength of the glass is increased because the internal compressive stresses added by the larger ions tend to retard the growth of cracks within the glass when subjected to external forces. Thus, glass which is not chemically strengthenable is glass which lacks significant requisite ion dopants needed for chemical strengthening.

Figure 2:
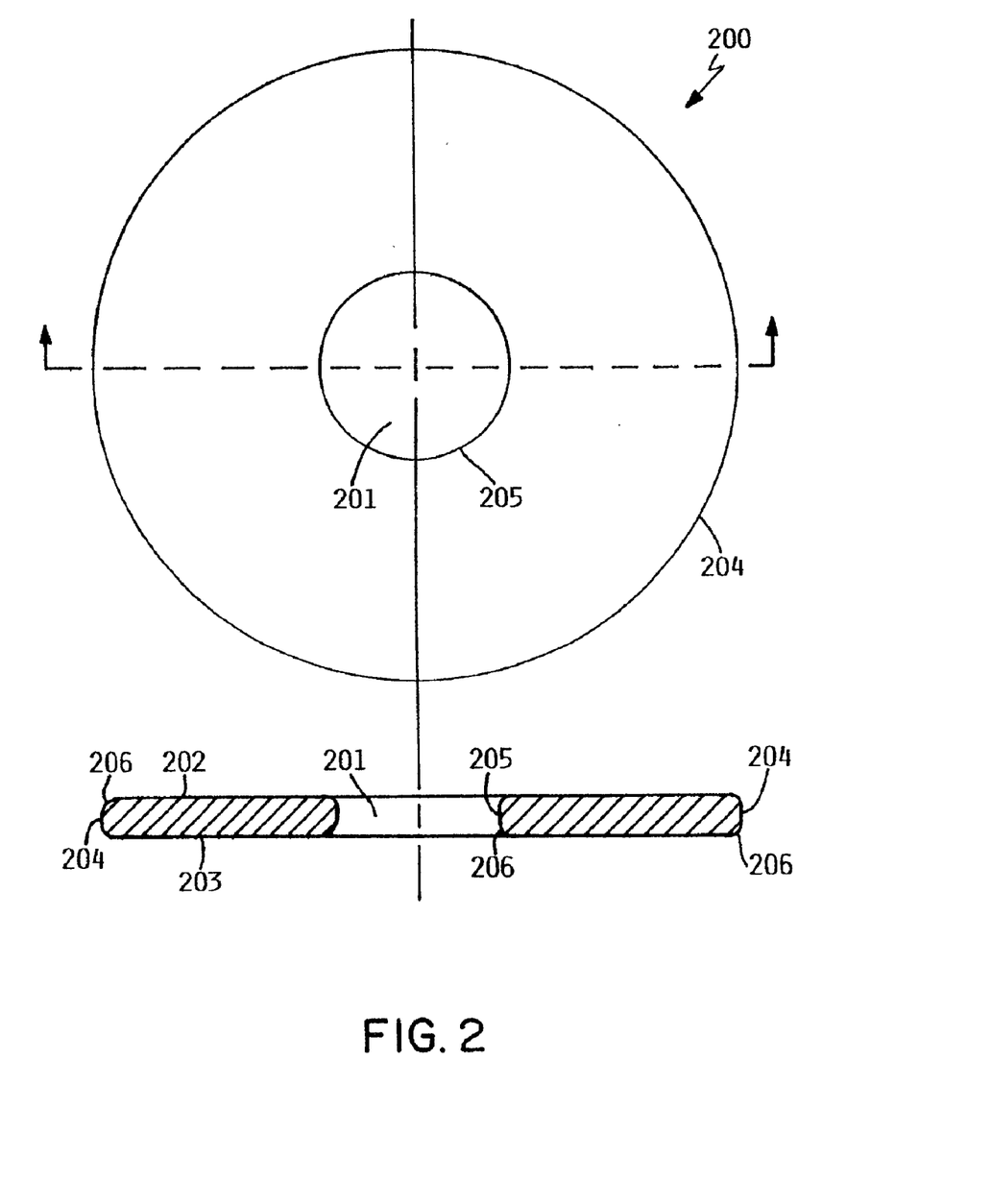
FIG. 2 illustrates a finished disk substrate in accordance with the preferred embodiment, shown in both a top view and a sectional view.

FIG. 2 illustrates a finished disk substrate 200 in accordance with the preferred embodiment, shown in both a top view and a sectional view in the plane of the disk axis. The thickness of the disk substrate in proportion to its diameter is exaggerated in the sectional view for illustrative purposes. For example, for a typical disk having an outer diameter of 95 mm and an inner diameter of 25 mm, the glass substrate should have a nominal thickness of approximately 1.05 mm. As shown, the disk is a flat, circular member having a circular central hole 201. The broad, flat surfaces 202, 203 are used for recording data; typically, both sides of the disk are used, although it is possible to use only one side. The periphery of the disk forms an outer circumferential edge 204. The central hole forms an inner circumferential edge 205. Both the outer and the inner edges are finished by ductile mode grinding, as described herein. The grinding wheels are shaped to provide radii 206 at the junctures of the edges with the broad flat surfaces. Radii reduce the internal material stresses and formation of cracks at these junctures, and therefore improve the strength of the finished product. In order to provide improved strength, it is preferred that the radius be no less than 0.175 mm, and specifically, that each radius be approximately a full radius, i.e., that the radius be approximately one-half the thickness of the substrate, so that the edge profile is semi-circular. However, it should be understood that these values could vary depending on the disk thickness and other factors, and that a disk could alternatively be produced as described herein but with beveled edge junctures instead of radii, with some other form of cornering, or with no cornering at all.

FIGS. 3–7 show various views of an apparatus 300 for grinding the circumferential edges of glass disk substrates in the ductile grinding regime, according to one variation of the preferred embodiment. The grinding apparatus 300 shown in FIGS. 3–7 and described herein is a conventional numerical control machine, as is known in the art, to which has been attached specially designed fixtures for grinding glass recording disk substrates in the ductile grinding regime.

Figure 3:
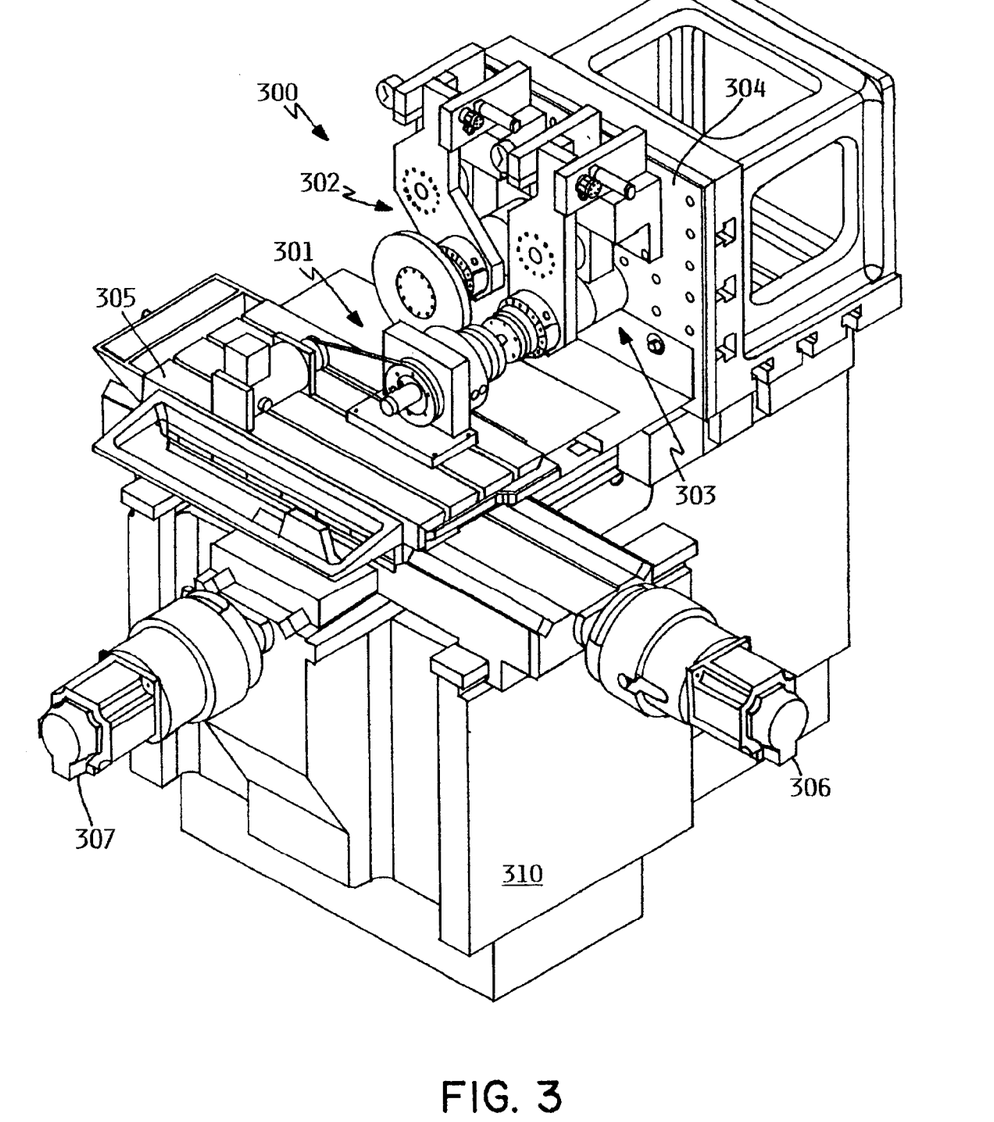
FIG. 3 is an isometric view of an edge grinding apparatus for a disk substrate, in accordance with the preferred embodiment.

FIG. 3 is an isometric view of the machine as a whole. Grinding machine 300 comprises a frame 310 to which is mounted a moveable horizontal table 305 and a vertical mounting panel 304. Vertical panel 304 is fixed to frame 310 and does not move. Horizontal table 305 is moveable in the x-y direction (i.e., any direction parallel to the floor) under control of numerical control positioning mechanisms 306, 307. Workpiece mounting fixture 301 for holding and rotating a workpiece (i.e., a disk substrate) is securely attached to table 305. A pair of grinding wheel mounting fixtures 302, 303 are mounted to vertical panel 304. Positioning mechanisms 306, 307 may be used for fine positioning of workpiece mounting fixture 301 relative to grinding wheel mounting fixtures 302, 303.

Figure 4:
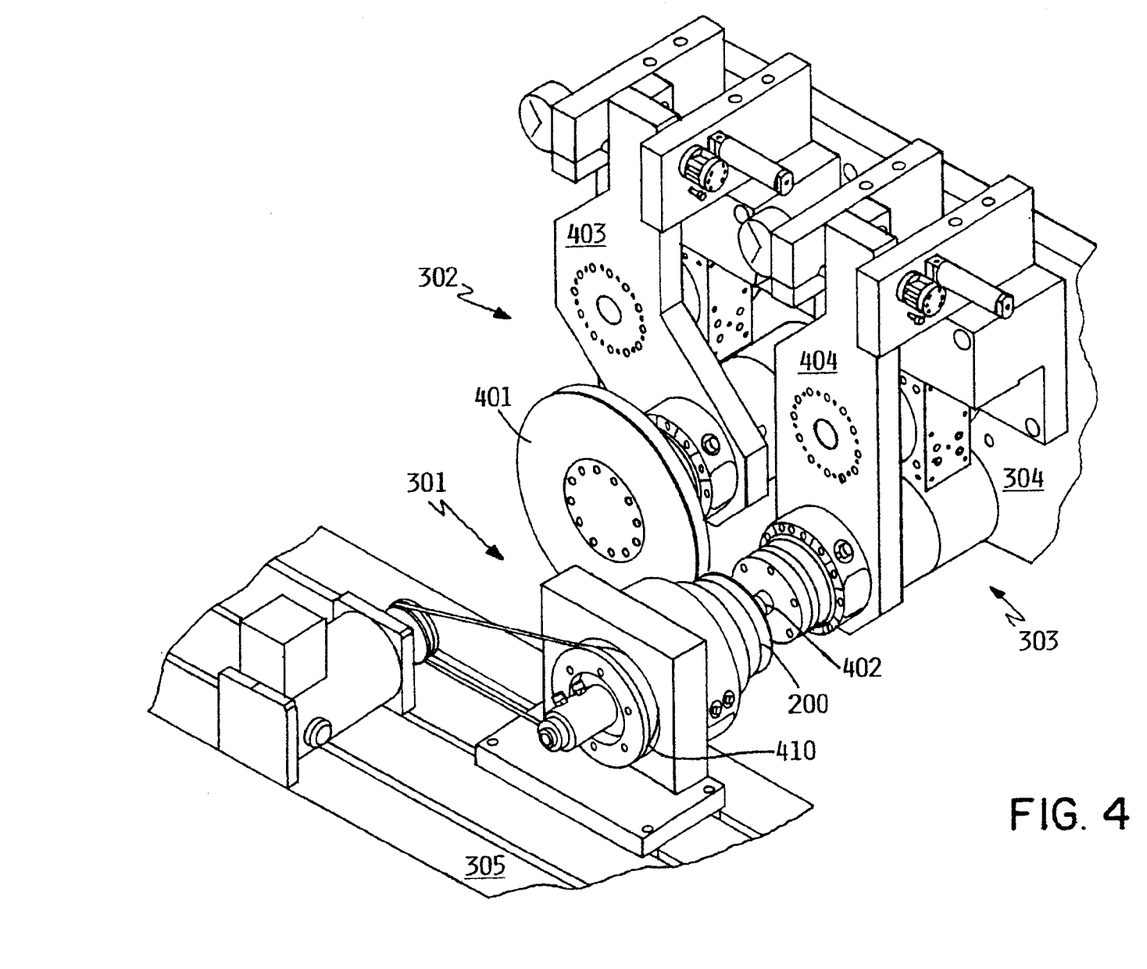
FIG. 4 is an enlarged partial isometric view of the grinding apparatus of FIG. 3, according to the preferred embodiment.

FIG. 4 is an enlarged partial isometric view of grinding apparatus 300, showing in greater detail workpiece mounting fixture 301 and grinding wheel mounting fixtures 302, 303. Grinding wheel fixture 302 comprises a pivoting arm 403 supporting a relatively large diameter grinding wheel 401 for grinding the outer circumferential edge 204 of disk substrate 200. Grinding wheel fixture 303 comprises a pivoting arm 404 supporting a relatively smaller diameter grinding wheel 402 for grinding the inner circumferential edge 205 of disk substrate 200.

Figure 5:
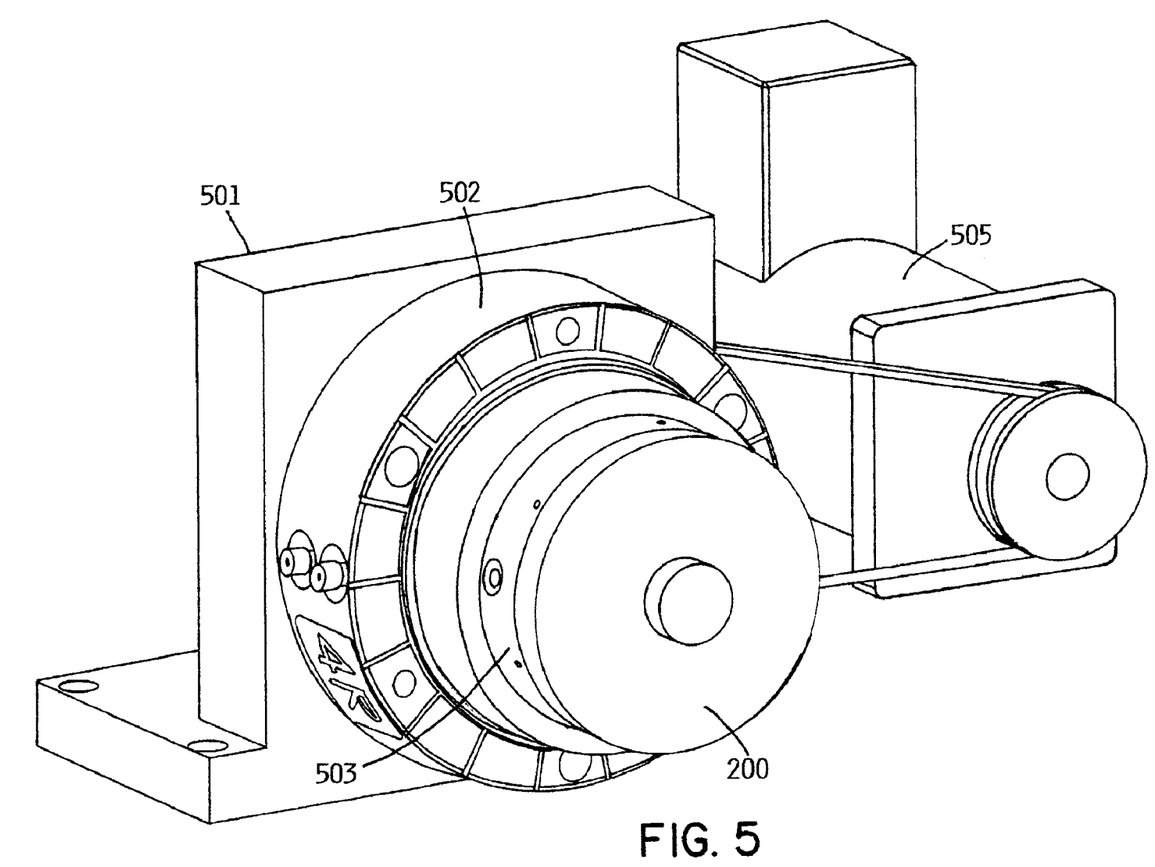
FIG. 5 is an enlarged view of a workpiece mounting fixture of the grinding apparatus of FIG. 3, according to the preferred embodiment.

FIG. 5 is an enlarged view (from an angle other than that of FIG. 4) of workpiece mounting fixture 301. Workpiece mounting fixture contains a fixed L-bracket housing 501 which is rigidly mounted to table 305, and which surrounds an air bearing 502 supporting a rotatable shaft. The shaft rotates on an axis parallel to table 305, and perpendicular to vertical mounting panel 304. A pulley 410 (not visible in FIG. 5, but visible in FIG. 4) is attached to the shaft on one side of housing 501, while a vacuum chuck 503 is attached to the shaft on the other side. Vacuum chuck 503 secures a disk substrate 200 during grinding operations by vacuum. A separate electric motor 505 is mounted to table 305. Motor 505 drives a belt wound around pulley 410 to rotate the shaft, vacuum chuck 503, and substrate 200 during grinding operations.

Figure 6:
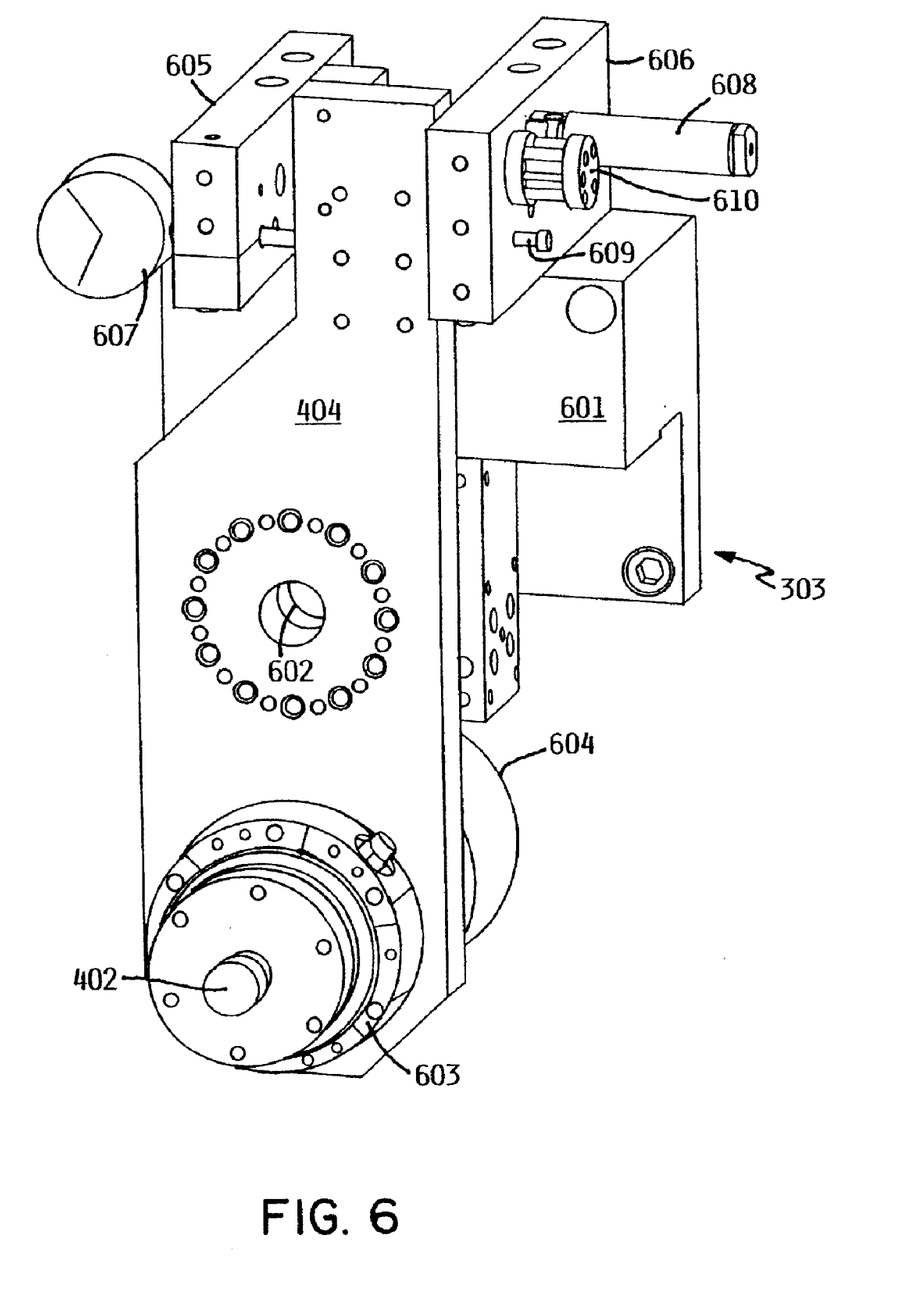
FIG. 6 is an enlarged view of a grinding wheel fixture of the grinding apparatus of FIG. 3, according to the preferred embodiment.

FIG. 6 is an enlarged view of grinding wheel fixture 303. Grinding wheel fixture 303 is supported entirely by L-bracket 601, which is rigidly attached to vertical panel 304. Fixture 303 contains pivotable arm 404 pivoting about pivot air bearing 602 (barely visible in FIG. 6) near the center of arm 404. Pivot air bearing 602 is mounted to L-bracket 601. At the lower end of arm 404 is a grinding wheel air bearing 603 supporting a rotatable shaft driven by an electric motor 604. Both the motor-driven shaft and arm 404 pivot about respective axes which are parallel to each other and perpendicular to vertical panel 304. Grinding wheel 402 is attached to the shaft driven by motor 604. The upper end of pivotable arm 404 is constrained to pivot between members 605 and 606, which are rigidly attached to and extend from L-bracket 601. Distance indicator 607 is attached to member 605, while constant force cylinder 608 is attached to member 606. Distance indicator measures the extension of a distance probe, which extends through a hole in member 606 to contact arm 404, thus permitting an accurate measurement of the position of pivotable arm 404. Constant force cylinder 608 is an enclosed cylinder for applying constant force to a piston (not visible) by means of air pressure. The piston is coupled to the upper end of pivotable arm 404. An external compressed air source (not shown) applies a constant air pressure to cylinder 608, thus maintaining a constant force on the piston and a constant torque on arm 404, regardless of the angular position of arm 404. Stops 609, 610 limit the arc of rotation of pivotable arm 404, preventing further removal of material when a predetermined limit has been reached.

Grinding wheel fixture 302 is similar in design and operation to grinding wheel fixture 303, although is supports larger grinding wheel 401 and the dimensions of pivotable arm 403 are different from those of arm 404. I.e., grinding wheel fixture 302 similarly contains a pivotable arm 403 in which the pivot is attached to L-bracket 601, which is in turn mounted to vertical panel 304; an air bearing supporting a motor-driven shaft to which is attached grinding wheel 401; and members extending from L-bracket 601 which constrain movement of pivot arm 403 and support a distance indicator, constant force cylinder, and stop mechanisms.

Bearing 503, which supports the rotating vacuum chuck and workpiece, bearing 602, which supports pivot arm 404, and bearing 603, which supports the small (inner diameter) grinding wheel 402, and corresponding bearings which supports the large (outer diameter) grinding wheel 401 and its pivot arm 403, are described herein as "air bearings". These bearings are static air bearings, in which the load is supported by compressed air supplied by an external source (not shown). Unlike dynamic fluid bearings, such static air bearings support the load regardless of rotational speed of the supported member, and even when the member is stationary. In addition to low friction, such bearings maintain the position of the rotating member at a high dimensional accuracy and with virtually no wobble or vibration.

Figure 7:
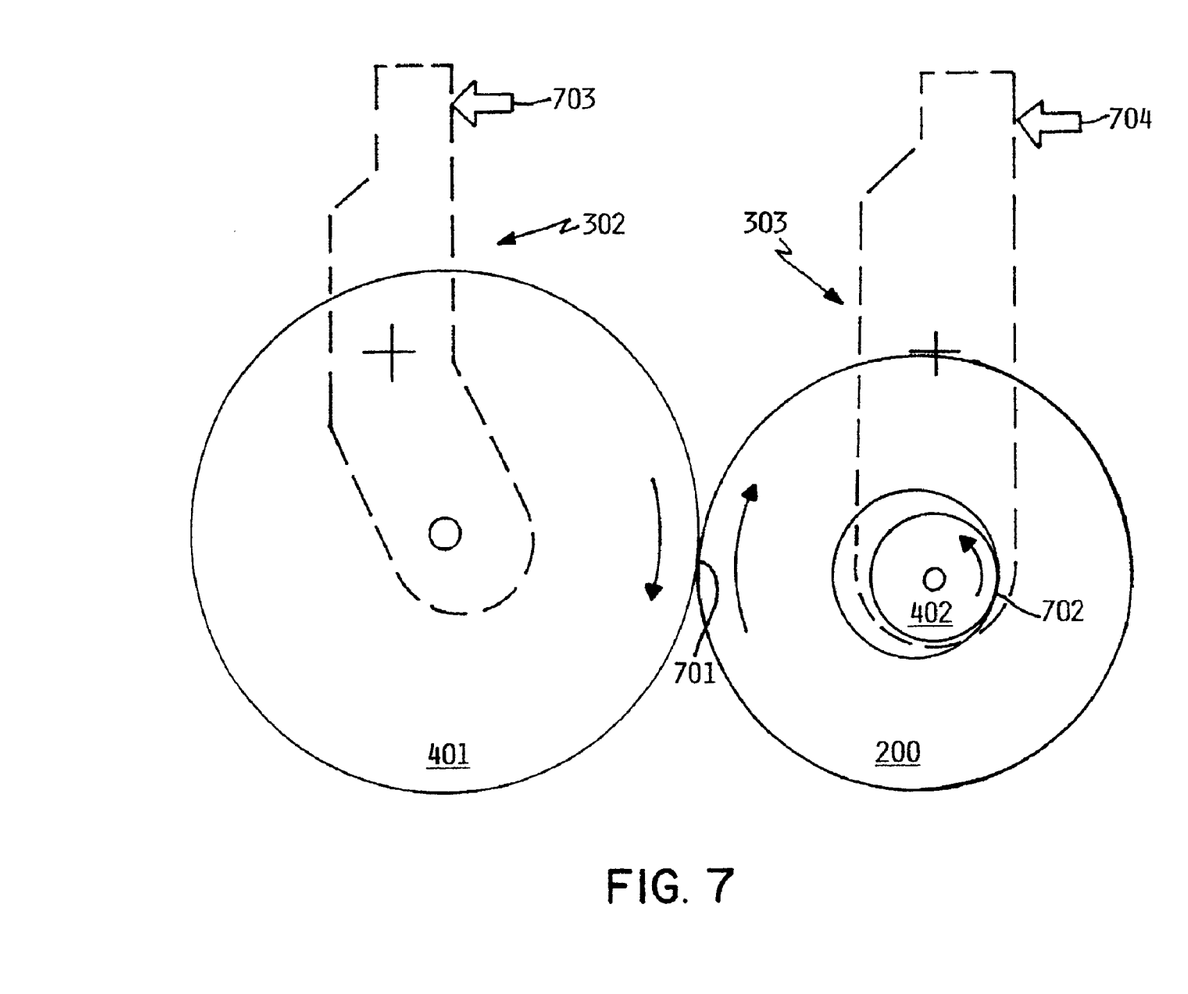
FIG. 7 is a simplified illustration of the motion of various parts during operation of the grinding apparatus of FIG. 3, according to the preferred embodiment.

FIG. 7 is a simplified illustration (not to scale) of the motion of various parts during operation of grinding apparatus 300. As shown in FIG. 7, disk substrate 200 and grinding wheel 401 are simultaneously rotated during operation, so that a circumferential edge of grinding wheel 401 and the outer circumferential edge of disk 200 move in opposite directions at the point of contact 701. Similarly, a circumferential edge of grinding wheel 402 and the inner circumferential edge of disk 200 move in opposite directions at the point of contact 702. A constant force 703 is applied to pivot arm 403 of grinding wheel fixture 302 by the constant force cylinder, which is transmitted through the pivot arm to point of contact 701 as a substantially radial force on substrate 200. Similarly, a constant force 704 is applied to pivot arm 404 of grinding wheel fixture 303 by a corresponding constant force cylinder, and is transmitted through the pivot arm to point of contact 702. The constant force cylinders thus maintain a controlled and constant force of the grinding wheels against the workpiece during operation. When the pivot arms have traveled a sufficient angular distance as a result of grinding, the arms encounter the stop mechanisms above described (not shown in FIG. 7), and further movement of the pivot arms is arrested, thus preventing further removal of substrate material.

Figure 8:
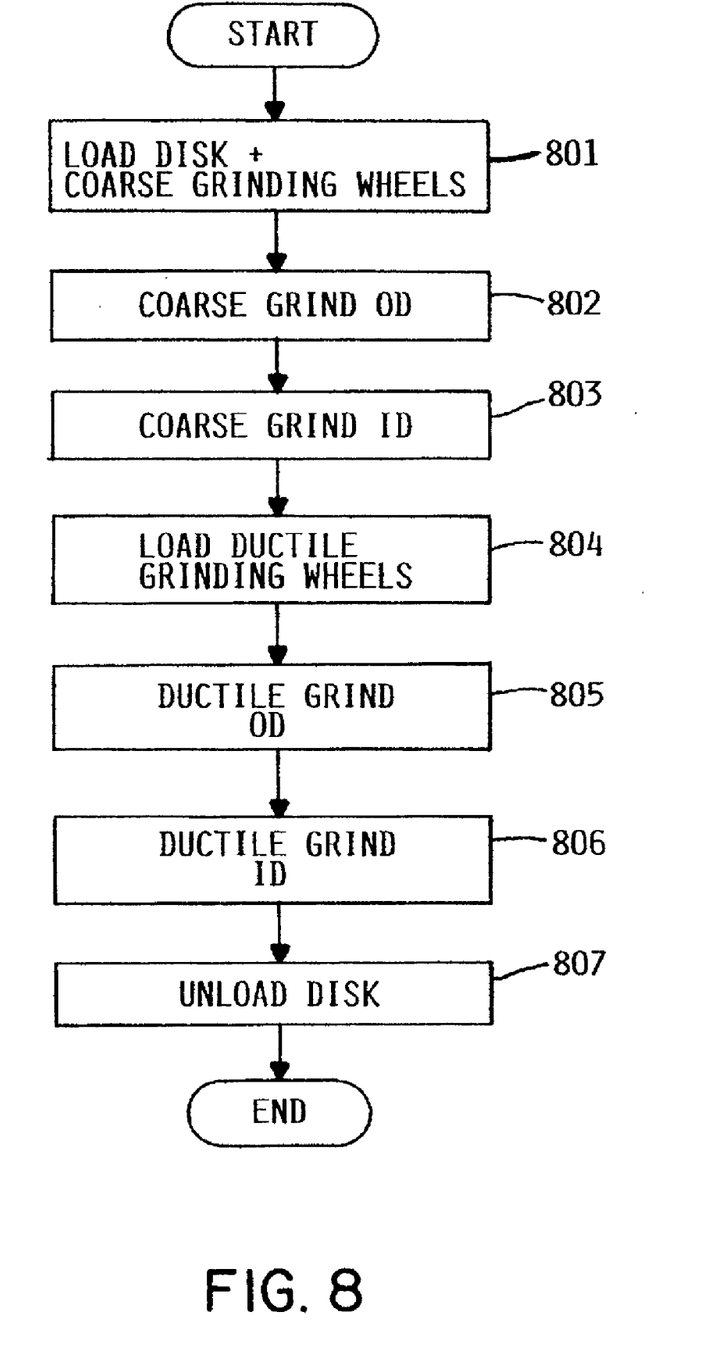
FIG. 8 is a process flow diagram showing the different process steps in finishing the edges of a disk substrate, according to the preferred embodiment.

FIG. 8 is a process flow diagram showing the different process steps in finishing the edges of a disk substrate. Initially, a single disk substrate 200 is loaded to edge finishing apparatus 300 by applying a vacuum to vacuum chuck 503 and placing the disk substrate on the chuck (step 801). Large and small grinding wheels 401, 402 are attached to rotating shafts at the ends of pivot arms 403, 404. The grinding wheels loaded at this stage are for coarse (non-ductile) grinding to remove sufficient material to bring the disk substrate near nominal diameter and concentricity. Specifically, it is preferred that the large grinding wheel 401 used for coarse grinding be a vitrified bond diamond formed grinding wheel, having polycrystalline diamond particles approximately 40 microns in size, and a diameter of approximately 150 mm, and that the small grinding wheel 402 used for coarse grinding be also a vitrified diamond bond formed grinding wheel of 40 micron polycrystalline diamonds, having a diameter of approximately 23 mm. Grinding wheels using metal, resin or resinoid bonds may also be used. These grinding wheels are suitably formed or dressed to provide the edge radiuses 206 described above.

The outer edge is then coarse ground to bring the disk substrate near nominal diameter and roundness (step 802). Preferably, coarse grinding the OD involves simultaneously rotating wheel 401 and disk 200, while a constant air pressure is applied to the constant force cylinder at the top of pivot arm 403. During this stage, pivot arm 404 is disengaged, so that no grinding is performed in the ID. In the preferred embodiment, wheel 401 is rotated at a speed of approximately 4000 rpm, while the disk is simultaneously rotated at a speed of approximately 100 rpm. Air pressure is supplied to provide a small grinding force (less than 5 pounds) normal to the surface at the point of contact. A grinding slurry, which is preferably a low percentage (20% or less) glycerol or propylene glycol in dionoized water, is fed to the grinding surface during coarse grinding operations. Coarse grinding continues at substantially constant parameters until sufficient material is removed so that the pivot arm 403 encounters a stop, and can no longer rotate to remove further material. At this point, grinding force drops essentially to zero, and the grinding machine is stopped. In the preferred embodiment, the coarse grinding of the OD takes approximately one minute or less, and removes material at a rate of approximately 250 microns/min, it being understood that this is only an estimate and not a process parameter, since the actual end of the grinding step is determined by the position of the pivot arm.

An analogous process is then used to grind the inner circumferential edge (step 803). I.e., wheel 402 and disk 200 are simultaneously rotated, while a constant air pressure is applied to the constant force cylinder at the top of pivot arm 404. During this stage, pivot arm 403 is disengaged, so that no grinding is performed at the OD. In the preferred embodiment, wheel 402 is rotated at a speed of approximately 25,000 rpm, while the disk is simultaneously rotated at a speed of approximately 100 rpm. The air cylinder applies a grinding force of less than 5 pounds at the point of contact. The same slurry is used as was used in step 802. Coarse grinding continues until pivot arm 404 encounters a stop, at which point grinding force drops essentially to zero, and the grinding machine is stopped. In the preferred embodiment, the coarse grinding of the ID takes approximately one minute or less, and removes material at a rate of approximately 250 microns/min.

The grinding wheels are then changed while the disk substrate 200 remains in place in the chuck (step 804). Specifically, ductile grinding wheels intended for fine grinding of the edges in the ductile grinding regime are substituted for the coarse grinding wheels. In the preferred embodiment, large grinding wheel 401 used for ductile grinding at the disk OD is a vitrified bond diamond formed grinding wheel, having polycrystalline diamond particles approximately 6 microns in size or less, and a diameter of approximately 150 mm, and the small grinding wheel 402 used for ductile grinding at the ID is also a vitrified diamond bond formed grinding wheel of 6 micron or less polycrystalline diamonds, having a diameter of approximately 23 mm. As with the coarse grinding wheels, the wheels used for the ductile grinding stage are suitable dressed or formed to conform to edge radiuses 206.

The edges are then ground in the ductile grinding regime. The purpose of ductile grinding is to remove a small fracture layer of material lying near the edge, which is left by the earlier coarse grinding operation. Ideally, ductile grinding leaves an edge without fractures. Such an edge is naturally strong, and does not require further chemical strengthening to achieve desired strength.

The outer edge of the substrate is then ground in the ductile grinding regime (step 805), by again simultaneously rotating grinding wheel 401 and substrate 200, while applying a constant force with the air cylinder to the top of pivot arm 403. In the preferred embodiment, wheel 401 is rotated at a speed of approximately 4000 rpm, while the disk is simultaneously rotated at a speed of approximately 100 rpm, giving a relative speed of approximately 30 m/sec at the point of contact between the grinding wheel and disk edge. Air pressure provides a grinding force normal at the point of contact of less than 5 pounds. A grinding slurry, which is preferably the same as the slurry used in coarse grinding, is fed to the grinding surface during ductile grinding. Ductile grinding continues at substantially constant parameters until sufficient material is removed so that the pivot arm 403 encounters a stop, and can no longer rotate to remove further material. At this point, grinding force drops essentially to zero, and the grinding machine is stopped. In the ductile grinding regime, a thin layer of surface material, approximately 50 microns thick, is removed, this being sufficient to remove virtually all fractures left by the coarse grinding process. In the preferred embodiment, the ductile grinding of the OD takes approximately two minutes or less.

The inner edge of the substrate is then ground in the ductile grinding regime in a similar manner (step 806). In the preferred embodiment, wheel 402 is rotated at a speed of approximately 25,000 rpm, while the disk is simultaneously rotated at a speed of approximately 100 rpm, giving a relative speed of approximately 30 m/sec at the point of contact between the grinding wheel and disk edge, being approximately the same relative speed as that used for ductile grinding the OD. A grinding force of less than 5 pounds is applied at the point of contact. The same grinding slurry that was used for OD ductile grinding is used for ID ductile grinding. Ductile grinding of the ID continues until pivot arm 404 encounters a stop, at which point grinding force drops essentially to zero, and the grinding machine is stopped. The thickness of material removed at the ID by ductile grinding is approximately the same as that removed at the OD, i.e. 50 microns. In the preferred embodiment, the ductile grinding of the ID takes approximately two minutes or less.

Ductile grinding is preferably carried out using a high relative speed at the point of contact. Ideally, this relative speed is approximately 30 m/sec or more. However, it will be recognized that in some cases it may be necessary to use a lower speed, e.g., because the finishing apparatus is not capable of such high speeds, and for at least some combinations of process parameters, a relative speed of 20 m/sec or more is believed to be adequate to produce acceptable finished edges. Such speeds could alternatively be achieved at lower grinding wheel speeds by simultaneously increasing the speed of the workpiece (disk). A wider range of grinding speeds could be used in the coarse grinding stages, but the relatively high speed is used in the preferred embodiment to achieve rapid material removal.

The edges of the disk having been finished, the disk is then unloaded from the grinding machine (step 807).

It will be understood that the order of certain operations in FIG. 8 could be changed, and in particular, that the order of steps 802 and 803 could be reversed, and the order of steps 805 and 806 could be reversed., or that both coarse and ductile grinding of one edge might be performed before any edge finishing operations are performed on the other edge.

The grinding apparatus shown in FIGS. 3–7 and described above was designed for low-volume experimentation and production of prototype disks in accordance with the preferred embodiment of the present invention. It will be appreciated that, for routine, high-volume production, various modifications may be made to the grinding apparatus, while still producing disks in accordance with the preferred embodiment. In particular, for high volume production, it would be preferable to avoid a manual operation of switching from a coarse to a fine grinding wheel during the edge grinding operation, described above as step 804. This could be accomplished by mounting a pair of grinding wheels in parallel alignment, rotating about a common axis on a single rotating spindle, one wheel being used for coarse grinding and the other for ductile grinding. A mechanism would be provided for moving either the workpiece (i.e., the disk) or the grinding wheels in the axial direction to selectively bring one or the other grinding wheel in contact with the disk edge. This pair of grinding wheels would be repeated at the outer and the inner diameter, so that four wheels in all would be used. The grinding wheels could be physically separate members which are joined on the spindle, or could be a common wheel having two different circumferential surface portions, each with its own respective roughness or other surface properties.

Although the grinding wheels are shown in FIG. 7 in simultaneous contact with disk substrate 200, in fact in prototyping operations inner and outer edge grinding operations are performed one after the other, as described above and shown in FIG. 8, so that both grinding wheels do not simultaneously contact the workpiece. This is done to avoid vibration or other effects of one grinding operation interfering with the other. However, it may be possible to achieve acceptable results performing both operations concurrently. I.e., it may be possible to perform steps 802 and 803 concurrently, and/or to perform steps 805 and 806 concurrently. In production mode this would be a desirable method if acceptable results can be thereby achieved, because it shortens the time required for edge finishing operations.

It will be understood by those skilled in the art that certain trade-offs exist among many of the process parameters described above, and that the parameters described above as part of the preferred embodiment are but one example of a set of possible parameters, which are believed to give a relatively low total process cost given currently available cost constraints. It is possible that many variations exist which could produce acceptable finished disk substrates, but which would vary the components of the total process cost. For example, the type of grinding wheel and other parameters used in the coarse grinding steps might be altered to produce a finer surface with shallower fractures, which may increase the time or other cost factors involved in the coarse grinding stage, but at the same time reduce time or other cost factors involved in the ductile grinding stage. Alternatively, it may be possible to avoid a coarse grinding stage altogether if the process used to initially cut or form the disk substrates provides parts which are sufficiently close to specification. Additionally, various alternative slurry compositions, types of grinding wheels, etc. might be used.

In the preferred embodiment, an unpolished glass disk is formed by rolling a glass sheet, cutting disks from the sheet, finishing the disk edges, and lapping the broad, flat disk surfaces to reduce the waviness, these steps being performed before the edge finishing process herein described. However, an unpolished glass disk may alternatively be formed by different processes, either now existing or hereafter developed. Additionally, the order in which process steps are performed may be altered.

In the preferred embodiment, the substrate is not subjected to chemical strengthening, and it is further preferred that the substrate material be a glass which is not chemically strengthenable. The finishing of disk edges by grinding in the ductile grinding regime as described herein leaves little or no fracturing at the disk edges. Minute fractures in brittle materials such as glass and ceramic significantly affect the break strength of the material. A finishing process which produces virtually no fracturing therefore produces a much stronger disk. The strength of a disk produced in accordance with the preferred embodiment is believed to be sufficient for application in typical disk drive storage devices without the need for chemical strengthening, and it is therefore recommended that chemical strengthening be foregone. The elimination of chemical strengthening has several beneficial effects. Most obviously, it removes process steps (e.g., an ion exchange step and a cleaning step), and reduces the cost of the manufacture accordingly. But it also has the potential to provide a superior finished product. A chemically strengthened disk or disk made of chemically strengthenable glass, having ion impurities, is subject to ion leaching under certain conditions. This leaching occurs over time, is typically not detected during manufacture, and may be so severe as to cause operational failure of the disk drive after installation in a user's data processing system. Additionally, a disk made of chemically strengthenable glass will rapidly leach ions under high temperature conditions, limiting the temperature of subsequent disk processing steps. There is reason to believe that higher temperature sputtering operations will produce a more uniform magnetizable layer, which may facilitate higher recording densities and/or improved reliability. For all these reasons, glass which is not chemically strengthenable is used in the preferred embodiment. However, it would alternatively be possible to finish the circumferential edges of a disk as described herein using a chemically strengthenable material, and to chemically strengthen the substrate after such edge finishing for even increased strength. It would additionally be possible to use a chemically strengthenable material (which may be more readily available than material which is not chemically strengthenable due to the prevalence of chemical strengthening in conventional disk finishing processes), and to simply omit the chemical strengthening step.

In the preferred embodiment, both the inner diameter edge at the central aperture and the outer diameter edge are finished as finished as described herein. However, it may alternatively be possible to finish only one of the edges according to the present invention, e.g., the outer edge, where larger stresses can be expected, and to finish the other edge by some other, possibly less exacting, process, or to not finish the other edge at all, depending on the process used to initially form the edge.

In the preferred embodiment, a glass or ceramic disk is produced having an edge radius, by grinding in the ductile regime and omitting a chemical strengthening step. However, in one aspect of the present invention, a disk is produced having one or more circumferential edge radii as described herein, without necessarily employing ductile grinding or omitting a chemical strengthening step.

As described earlier, a glass disk substrate produced in accordance with the preferred embodiment is suitable for use in a rotating magnetic disk drive data storage device. However, such an application is not necessarily the only application in which a glass disk substrate produced in accordance with the present invention may be used. For example, there may be other data recording techniques, now known or hereafter developed, which require a glass or ceramic disk substrate. Data may, e.g. be recorded on disk surfaces in an optically encoded form, or in some other form. In this case, there may be certain variations in disk structure from those described above, e.g., the absence of a magnetizable layer. Additionally, there may be other layers not described herein, either now known or hereafter developed, which are deposited over the glass disk substrate after manufacture of the substrate in accordance with the present invention.

Although a specific embodiment of the invention has been disclosed along with certain alternatives, it will be recognized by those skilled in the art that additional variations in form and detail may be made within the scope of the following claims:

What is claimed is:

1. A method for manufacturing a disk substrate for a rotating disk drive data storage device, comprising the steps of:

providing a disk substrate having a circumferential edge, said disk substrate being of a material from the set of materials consisting of: glass, ceramic, and a combination of glass and ceramic;

loading said disk substrate to an edge finishing apparatus; and grinding said circumferential edge of said disk substrate in a ductile grinding regime using said edge finishing apparatus;

wherein said disk substrate is finished for installation in a disk drive data storage device without chemical strengthening of said disk substrate.

2. The method for manufacturing a disk substrate of claim 1, wherein said disk drive data storage device is a rotating magnetic disk drive data storage device, said disk substrate being subsequently coated with a magnetic coating after said grinding step.

3. The method for manufacturing a disk substrate of claim 1, further comprising the step of coarse grinding said circumferential edge in a non-ductile mode, said step of coarse grinding said circumferential edge in a non-ductile mode being performed before said step of grinding said circumferential edge in a ductile grinding regime.

4. The method for manufacturing a disk substrate of claim 1, wherein said disk substrate contains an outer circumferential edge at the periphery thereof and a central aperture defining an inner circumferential edge, and wherein said grinding step is applied to both said outer circumferential edge of said disk substrate and to said inner circumferential edge.

5. The method for manufacturing a disk substrate of claim 1, wherein said grinding step comprises grinding said edge with a formed grinding appliance conforming to an edge radius at said circumferential edge.

6. The method for manufacturing a disk substrate of claim 1, wherein said grinding step comprises bringing a grinding appliance of said edge finishing apparatus in contact with said circumferential edge and providing relative motion between said grinding appliance and circumferential edge of approximately 30 m/sec or more.

7. The method for manufacturing a disk substrate of claim 1, wherein said edge finishing apparatus comprises a grinding appliance having diamond particles of approximately 6 microns or less.

8. The method for manufacturing a disk substrate of claim 1, wherein said disk substrate is of a material which is not chemically strengthenable.

9. A method for manufacturing a disk substrate for a rotating disk drive data storage device, comprising the steps of:

providing a disk substrate having a cut, unfinished circumferential edge, said disk substrate being of a material from the set of materials consisting of glass, ceramic, and a combination of glass and ceramic, wherein said disk substrate material is not chemically strengthenable; and finishing said circumferential edge of said disk substrate to a finished state suitable for use in a disk drive data storage apparatus using at least one edge finishing apparatus.

10. The method for manufacturing a disk substrate of claim 9, wherein said step of finishing said circumferential edge of said disk substrate comprises grinding said edge in a ductile grinding regime.

11. The method for manufacturing a disk substrate of claim 9, wherein said disk drive data storage device is a rotating magnetic disk drive data storage device, said method further comprising the step of coating at least one flat surface of said disk substrate with a magnetic coating, said coating step being performed after said grinding step.

12. The method for manufacturing a disk substrate of claim 9, wherein said disk substrate contains an outer circumferential edge at the periphery thereof and a central aperture defining an inner circumferential edge, and wherein said finishing step comprises finishing both said outer circumferential edge of said disk substrate and said inner circumferential edge.

13. The method for manufacturing a disk substrate of claim 9, wherein said step of finishing said circumferential edge grinding step comprises forming an edge radius at said circumferential edge.

14. A method for manufacturing a disk substrate for a rotating disk drive data storage device, comprising the steps of:

providing a disk substrate having a cut, unfinished circumferential edge, said disk substrate being of a material from the set of materials consisting of glass, ceramic, and a combination of glass and ceramic;

finishing said circumferential edge of said disk substrate to a finished state suitable for use in a disk drive data storage apparatus by application of mechanical forces using at least one edge finishing apparatus, said finishing step being accomplished without chemical strengthening of said disk substrate.

15. The method for manufacturing a disk substrate of claim 14, wherein said disk substrate is of a material which is not chemically strengthenable.

16. The method for manufacturing a disk substrate of claim 14, wherein said step of finishing said circumferential edge of said disk substrate comprises grinding said edge in a ductile grinding regime.

17. The method for manufacturing a disk substrate of claim 14, wherein said disk drive data storage device is a rotating magnetic disk drive data storage device, said method further comprising the step of coating at least one flat surface of said disk substrate with a magnetic coating, said coating step being performed after said grinding step.

18. The method for manufacturing a disk substrate of claim 14, wherein said disk substrate contains an outer circumferential edge at the periphery thereof and a central aperture defining an inner circumferential edge, and wherein said finishing step comprises finishing both said outer circumferential edge of said disk substrate and said inner circumferential edge.

19. The method for manufacturing a disk substrate of claim 14, wherein said step of finishing said circumferential edge grinding step comprises forming an edge radius at said circumferential edge.

* * * * *